Feb. 19, 1957   W. T. M. JOHNSON   2,782,132
METHYL METHACRYLATE LACQUER COATED
METAL ARTICLE AND PROCESS THEREFOR
Filed June 4, 1954
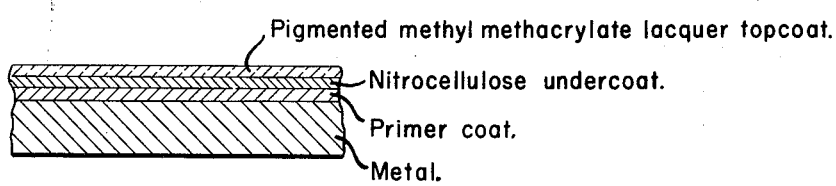
INVENTOR
WILLIAM T. M. JOHNSON
BY  *Ernest H. Beck*
ATTORNEY

United States Patent Office 2,782,132
Patented Feb. 19, 1957

2,782,132

METHYL METHACRYLATE LACQUER COATED METAL ARTICLE AND PROCESS THEREFOR

William T. M. Johnson, Philadelphia, Pa., assignor to E. I. du Pont de Nemours and Company, Wilmington, Del., a corporation of Delaware Application June 4, 1954, Serial No. 434,664

2 Claims. (Cl. 117—74)

This invention relates to multiple-layer finishing systems for metal, and more particularly to such systems comprising a pigmented primer in contact with the metal, a nitrocellulose undercoat over said primer, and a pigmented methyl methacrylate lacquer topcoat over said undercoat.

The term "polymer of methyl methacrylate" and related terms, as used herein, mean homopolymers of methyl methacrylate, copolymers of methyl methacrylate and other materials copolymerizable therewith containing a major proportion of methyl methacrylate, or mixtures of such homopolymers and/or copolymers.

The terms "methyl methacrylate lacquer," "methyl methacrylate coating composition," and related terms as used herein for the sake of brevity, mean liquid coating compositions containing conventional pigments and solvents and, as the principal film-forming material, a polymer of methyl methacrylate. The methyl methacrylate lacquers may also contain conventional modifiers, such as plasticizers, inhibitors, dispersing agents, flow control agents and the like. When reference is made to a layer, or film, of methyl methacrylate lacquer the term signifies a dry layer obtained by applying one or more coatings of such liquid compositions to a suitable substrate and permitting or causing the coating to dry.

The term "primer," as used herein, means a liquid coating composition which is applied to the metal article being coated, or a dry layer thereof derived from one or more applications of the liquid composition.

The term "undercoat," as used herein, means a different liquid coating composition which is applied directly over the primer, or a dry layer thereof derived from one or more applications of the liquid composition.

The term "topcoat," as used herein, means the last liquid coating composition which is applied to the metal article being coated, or a dry layer thereof derived from one or more applications of the liquid composition.

The term "finishing system," as used herein, means a multiple-layer coating of at least three different coating compositions comprising a primer, an undercoat, and a top layer in adherent contact therewith.

It is known that polymers of methyl methacrylate have excellent outdoor durability. In particular, pigmented lacquers containing methyl methacrylate polymers as the principal film-forming material have excellent gloss retention, i. e., the original high gloss is retained during long periods of outdoor exposure. However, such compositions do not inherently possess the high level of metal-protecting and rust-inhibiting properties required for painting metal which is to be used outdoors, e. g., steel automobile bodies. Therefore, in order to take advantage of the excellent durability of methyl methacrylate lacquers, the metal to be finished must first be primed with a metal-protecting and rust-inhibiting primer.

It has been found that the conventional metal primers which are commonly used under alkyd resin enamel, amino-aldehyde resin enamel or nitrocellulose lacquer topcoats are not suitable for use under methyl methacrylate lacquer topcoats. More specifically, the durability advantages of methyl methacrylate lacquer topcoats cannot be fully realized with these primers because of poor adhesion of the topcoat to the primer. This may be observed immediately after the topcoat is applied and dried, or it may develop after the coated article is placed in service. In some cases the adhesion is so poor that the topcoat will flake and fall off the article, although this is usually observed only after prolonged outdoor exposure. In other cases, the topcoat appears to adhere, but some or all of this can be peeled from the primer so easily that it does not remain intact during normal service.

The broad object of this invention is to provide an improved multiple-layer metal finishing system comprising a topcoat of a methyl methacrylate lacquer, whereby the adhesion of the topcoat is such that full advantage can be taken of the excellent durability of the methyl methacrylate lacquer during prolonged service outdoors.

A specific object of this invention is to provide a multiple-layer metal finishing system comprising a pigmented primer, a nitrocellulose undercoat, and a methyl methacrylate lacquer top layer, i. e., a finishing system which differs from prior art finishing systems in that it possesses simultaneously the essential properties of excellent adhesion of the topcoat and excellent durability of the multiple-coat finishing system during prolonged service outdoors.

A further object is to provide metal articles, particularly steel articles, having an adherent and durable multiple-layer protective coating comprising a methyl methacrylate top layer.

These objects are accomplished by providing a multiple-layer finishing system for metal consisting of a layer of pigmented primer in adherent contact with said metal, a layer of undercoat in adherent contact with said primer, and a top layer of methyl methacrylate lacquer in adherent contact with said undercoat, said undercoat consisting of lacquer-grade nitrocellulose, 0–50% of plasticizer therefor based on the weight of the nitrocellulose, and 0–45% of pigment based on the total weight of the nitrocellulose and plasticizer.

In the drawing there is illustrated an enlarged cross sectional view of a representative portion of a coated metal article of the invention.

Thus, according to this invention, a solution to the problem of poor adhesion of a methyl methacrylate top layer to primed metal has been found in applying directly over the primer, prior to application of the methyl methacrylate lacquer top layer, a layer of a liquid coating composition consisting essentially of a solution of lacquer-grade nitrocellulose in conventional lacquer solvents, with or without a suitable amount of plasticizer for the nitrocellulose, and with or without a suitable amount of pigment of the type commonly used by the organic coating industry in undercoats.

With the above and the other objects in view, which will be apparent as the description proceeds, I have set forth my invention in the following specification, and have included several specific examples by way of illustration, but not by way of limitation. Unless otherwise specified, the parts and percentages are given by weight.

*Example 1*

A nitrocellulose undercoat of this invention was prepared as follows:

First portion:                                                   Parts by weight
    ½″ lacquer-grade nitrocellulose, 25% solution in lacquer solvents_____ 0.56
    Titanium dioxide_____ 0.91
    Carbon black_____ 0.01

Second portion:

| | |
|---|---|
| ½″ lacquer-grade nitrocellulose, 23% solution in lacquer solvents | 79.17 |
| Lacquer solvents | 19.35 |
| | 100.00 |

The composition was prepared by grinding the ingredients of the first portion in conventional paint grinding equipment until a smooth uniform dispersion was obtained. Then the ingredients of the second portion were admixed therewith to produce a liquid coating composition.

In this composition, there was no plasticizer; and pigment was present in the amount of about 5% by weight of the nitrocellulose.

*Example 2*

A pigmented nitrocellulose undercoat of this invention was prepared as follows:

First portion: Parts by weight

| | |
|---|---|
| ¾″ lacquer-grade nitrocellulose, 70% nitrocellulose, 30% isopropanol | 1.55 |
| ½″ lacquer-grade nitrocellulose, 70% nitrocellulose, 30% isopropanol | 6.17 |
| Lacquer solvents | 26.86 |
| Red iron oxide | 1.62 |

Second portion:

| | |
|---|---|
| ½″ lacquer-grade nitrocellulose, 23% solution in lacquer solvents | 63.80 |
| | 100.00 |

The composition was prepared as in Example 1.

In this composition, there was no plasticizer; and pigment was present in the amount of about 8.1% by weight of the nitrocellulose.

*Example 3*

A pigmented nitrocellulose undercoat of this invention was prepared as follows:

First portion: Parts by weight

| | |
|---|---|
| ¼″ lacquer-grade nitrocellulose, 29.6% solution in lacquer solvents | 4.7 |
| Titanium dioxide | 10.7 |
| Lacquer solvents | 4.3 |

Second portion:

| | |
|---|---|
| ⅛″ lacquer-grade nitrocellulose, 29.6% solution in lacquer solvents | 80.3 |
| | 100.0 |

The composition was prepared as in Example 1.

In this composition, there was no plasticizer; and pigment was present in the amount of about 42.6% by weight of the nitrocellulose.

*Example 4*

A clear nitrocellulose undercoat of this invention was prepared by mixing the following ingredients:

| | Parts by weight |
|---|---|
| ⅛″ lacquer-grade nitrocellulose, 40% solution in lacquer solvents | 37.5 |
| Lacquer solvents | 62.5 |
| | 100.0 |

*Example 5*

A clear plasticized nitrocellulose undercoat of this invention was prepared by mixing the following ingredients:

| | Parts by weight |
|---|---|
| ⅛″ lacquer-grade nitrocellulose, 40% solution in lacquer solvents | 28.4 |
| Dicyclohexyl phthalate | 3.7 |
| Lacquer solvents | 67.9 |
| | 100.0 |

In this composition, there was no pigment, and plasticizer (dicyclohexyl phthalate) was present in the amount of 32.6% by weight of the nitrocellulose. This product may be pigmented to produce an undercoat of this invention containing nitrocellulose, plasticizer and pigment by grinding up to 6.75 parts of pigment in the abovedescribed clear product, i. e., up to 45% of pigment based on the total weight of nitrocellulose and plasticizer.

Finishing systems of this invention comprising the nitrocellulose undercoats of Examples 1–5, and prior art finishing systems containing no undercoats, were prepared in the following general manner for subsequent testing. Clean autobody steel panels, some of which were untreated and others of which were treated with a rustproofing composition, such as "Bonderite," were first coated with a variety of widely accepted commercially available primers. The lower half of each primed panel was then undercoated with one of the undercoats of Examples 1–5 so that each of the undercoats was applied over one or more of the conventional primers. Then a methyl methacrylate lacquer top layer was applied over the whole area of each of the panels. Thus the upper half of each panel represented a prior art primer with a methyl methacrylate lacquer top layer (top layer directly over primer) and the lower half represented a finishing system of this invention (top layer over undercoat over primer).

A more detailed description of the manner in which these finishing systems were prepared is as follows:

The conventional primers all contained suitable amounts of commonly-used undercoat pigments. Their organic film-forming constituents were as follows, on a non-volatile solids basis:

Primer A: Parts by weight

| | |
|---|---|
| 55% linseed oil modified glycerol phthalate resin | 59.3 |
| 50% linseed oil modified phenol-formaldehyde resin varnish | 40.7 |
| | 100.0 |

Primer B:

| | |
|---|---|
| 65% linseed oil modified ester gum varnish | 92.8 |
| Bodied linseed oil | 7.2 |
| | 100.0 |

Primer C:

| | |
|---|---|
| 43% soya oil modified glycerol phthalate resin | 11.2 |
| 35% soya oil modified glycerol phthalate resin | 68.4 |
| Butylated urea-formaldehyde resin | 20.4 |
| | 100.0 |

Primer D:

| | |
|---|---|
| 43% soya oil modified glycerol phthalate resin | 100.0 |

Primer E:

| | |
|---|---|
| 52% soya oil modified glycerol phthalate resin | 100.0 |

Primer F:

| | |
|---|---|
| 65% linseed oil modified ester gum varnish | 86.8 |
| Bodied linseed oil | 13.2 |
| | 100.0 |

The primers were sprayed on the panels in sufficient amount to produce dry coatings about 0.5 mil thick. Due to their different drying characteristics, the wet primed panels were baked at different temperatures for different lengths of time as follows, to produce the proper degree of cure or hardness:

| | Baking conditions |
|---|---|
| Primer A | 30 minutes at 250° F. |
| Primer B | 30 minutes at 370° F. |
| Primer C | 45 minutes at 275° F. |
| Primer D | 30 minutes at 180° F. |
| Primer E | 15 minutes at 400° F. |
| Primer F | 30 minutes at 250° F. |

The primed panels were cooled to room temperature and the bottom half was sprayed with one of the undercoats of Examples 1–5 in an amount sufficient to produce a dry coating of undercoat about 0.4 mil thick, each undercoat having been used on at least one set of test panels. The undercoats were air dried for about 5 minutes.

Finally, the whole area of each of the panels was sprayed with a typical methyl methacrylate topcoat lacquer, which had been thinned to suitable spraying viscosity, in sufficient amount to produce dry layers of topcoat about 2 mils thick. The wet topcoated panels were baked for 20 minutes at 180° F. to speed up the drying, which would require 16–24 hours at room temperature, whereby dry hard coatings were produced. The methyl methacrylate lacquer had the following composition:

| | Parts by weight |
|---|---|
| Homopolymer of methyl methacrylate | 29.74 |
| Dibutyl phthalate | 11.93 |
| Titanium dioxide | 7.16 |
| Carbon black | 0.07 |
| Ferrite yellow | 0.98 |
| Red iron oxide | 0.12 |
| Toluol | 25.00 |
| Xylol | 25.00 |
| | 100.00 |

The homopolymer of methyl methacrylate employed in this composition had a relative viscosity of about 1.142. This value is the value of the fraction $$\frac{(A) \quad \text{Efflux time of polymer solution}}{(B) \quad \text{Efflux time of solvent used in polymer solution}}$$

The efflux times were measured in accordance with the procedure of A. S. T. M. D–445–46T Method B, using as the "oil" mentioned in said procedure, (A) a solution of 0.25 gram of the methyl methacrylate polymer in 50 cc. of ethylene dichloride, and (B) a sample of the ethylene dichloride used in making said solution, respectively. The determinations were run at 25° C. in a modified Ostwald viscosimeter, series 50.

The methyl methacrylate lacquer was prepared by grinding the pigment in the presence of the polymer until a smooth uniform dispersion was obtained.

The thus coated panels had acceptable properties with respect to appearance, gloss and hardness; and no differences were readily apparent between the areas using a prior art primer but no nitrocellulose undercoat and those having a finishing system of this invention.

The top (not undercoated) and bottom (undercoated) halves of each panel were tested for the critical property of top layer adhesion by cutting two 2" marks in the form of an X vertically through the coating down to the metal, securely pressing a strip of pressure-sensitive cellophane adhesive tape over the X, and pulling it off with a jerk, whereby varying amounts of the finishing system were removed and it could be observed how well each layer adhered to the layer therebeneath.

In each case it was determined that the methyl methacrylate lacquer top layer adhered poorly to the primer and was rather easily stripped off cleanly. In contrast, the top layer adhered well to the undercoat, as evidenced by the fact that the adhesive tape either came off without any attached portions of the finishing system or, if portions were peeled off, it appeared that adhesion had failed in a random manner at the various interfaces of the finishing system.

These test results confirmed the analogous observation that freshly prepared methyl methacrylate finishing systems containing a nitrocellulose undercoat would withstand more handling and abuse without failure by loss of adhesion than would similar finishing system not containing the nitrocellulose undercoat.

These test results on freshly prepared finishing systems were further substantiated when duplicate panels were exposed outdoors in Florida for eight months or longer. During this period all of the areas where the methyl methacrylate lacquer top layer had been applied directly to the primer failed by loss of top layer adhesion, some so badly that a light rubbing or brushing or a strong air current would remove the top layer. In all cases, the top layer remained adherent where it had been applied over a nitrocellulose undercoat in accordance with this invention.

The above-described results make it obvious that the finishing systems of this invention are far more serviceable than those of the prior art, initially and during prolonged service outdoors, as is the case with automobile bodies, for instance.

The particular grade of nitrocellulose employed in the examples is merely illustrative of a wide variety of lacquer-grade nitrocellulose which may be used in the undercoats of this invention. Other suitable grades are those having a viscosity rating of ⅛" to 1", with or without small proportions of grades having viscosity ratings as high as 50" or 100". ⅛" nitrocellulose has a viscosity of about 20 centipoises, and 100" nitrocellulose has a viscosity of about 38,000 centipoises, when measured as a 12.2% solution described in A. S. T. M. Method D–301–33, Formula A. Such grades of nitrocellulose or mixtures thereof may be substituted for the nitrocellulose employed in the examples to provide undercoats and finishing systems having equivalent properties.

The preferred grade of nitrocellulose is ⅛"–½", having a viscosity of 20–150 centipoises.

The concentration of nitrocellulose in the undercoats of this invention may vary over a wide range, e. g., from 5% by weight of the total liquid undercoat composition to 40% or higher. Low concentrations tend to waste solvent and produce undesirably thin films; high concentrations tend to be too viscous for easy application. The preferred nitrocellulose concentration is 10–30% of the total liquid composition.

Suitable nitrocellulose plasticizers are, for instance, dibutyl phthalate, benzyl butyl phthalate, dicyclohexyl phthalate, di(2-ethyl hexyl) phthalate, the phthalic acid diesters of ethylene glycol monomethyl or monobutyl ether, tricresyl phosphate, triphenyl phosphate, toluene ethyl sulfonamide, butyl phthalyl butyl glycolate, methyl phthalyl ethyl glycolate, glycol sebacate, polyethylene glycol sebacates, and the like. Such plasticizers may be used in Examples 1–4 in amounts up to 50%, based on the weight of the nitrocellulose, or such other plasticizers may be substituted for the dicyclohexyl phthalate in Example 5, to provide undercoats, and hence finishing systems, having properties equivalent to those disclosed for the products of Examples 1–5.

The preferred nitrocellulose undercoats do not contain any plasticizer. When a plasticizer is used, dicyclohexyl phthalate or benzyl butyl phthalate is preferred. The preferred amount of plasticizer, when used, is 10–30% based on the weight of nitrocellulose.

Suitable lacquer solvents for use in the undercoats of this invention are the well-known solvents for nitrocellulose, and mixtures thereof, with or without commonly used hydrocarbon diluents. Such solvents and diluents include esters such as ethyl acetate, butyl acetate or ethylene glycol monoethyl ether acetate, ketones such as acetone or methyl ethyl ketone, alcohols such as ethyl or isopropyl alcohol, ethers such as ethylene glycol monobutyl ether, and hydrocarbons such as toluene, xylene or naphtha.

Suitable pigments for use in the coating compositions of this invention include titanium dioxide, zinc oxide, iron oxide, zinc chromate, carbon black, iron blue, phthalocyanine blue or green, barytes, whiting, talc, china clay, organic maroons, chromium tetrahydrate and other pigments, or mixtures thereof, which are commonly employed in the organic coating art. Such pigments may be used in any amount up to about 45%, based on the total weight of nitrocellulose and plasticizer. The preferred nitrocellulose undercoats of this invention contain 5–30% of pigment based on the total weight of nitrocellulose and plasticizer. Obviously, if no plasticizer is used, the percentage of pigment is based on the nitrocellulose alone and, in the preferred embodiment, would therefore vary from 5–30% thereof.

The coating compositions employed in this invention may be applied by any convenient method, such as spraying, dipping or brushing, although spraying is preferred. The thickness of the individual coatings so applied is not critical, provided the normal limits employed in the lacquer or organic enamel arts, e. g., 0.2–2.0 mils per coat, are observed.

Metal primers are produced in air-drying or baking modifications; and, since the method of drying is not critical, both types are included in this invention.

Since the undercoats are based on nitrocellulose, the preferred and most convenient method of drying them is by normal evaporation of the volatile components at room temperature, which requires only a few minutes. However, the undercoats may be force dried or baked, if desired, by exposing the undercoated article to an elevated temperature, e. g., 150–200° F., for 5–20 minutes.

It is to be understood that the methyl methacrylate lacquer employed as a top layer in the foregoing description of this invention is merely representative of a wide variety of such lacquers which may be used in the improved finishing systems of this invention. All of the constituents of said lacquer may be varied in kind and/or proportion by means well-known in the art. A suitable homopolymer of methyl methacrylate is specifically disclosed. Suitable copolymers include copolymers of methyl methacrylate with a minor proportion, e. g., 2–25% of another material copolymerizable therewith, for instance, acrylic and methacrylic acids, the $C_1$–$C_4$ alkyl esters of acrylic acid, the $C_2$–$C_4$ alkyl esters of methacrylic acid, vinyl acetate, acrylonitrile, and styrene. A particularly useful copolymer contains about 98% of methyl methacrylate and 2% of methacrylic acid.

The preferred polymers for use in the methyl methacrylate lacquers have a relative viscosity between 1.117 and 1.196, as measured by the previously defined method, which correspond to calculated molecular weight values of 55,000 to 105,000, respectively, and topcoat lacquers based on such polymers are disclosed and claimed in a copending application filed of even date herewith by Laverne W. Crissey and John H. Lowell. Still other topcoat lacquers which are particularly adapted to convenient spray application are disclosed and claimed in copending application Serial No. 402,498, filed January 6, 1954, by Laverne W. Crissey and John H. Lowell.

The preferred finishing systems of this invention consist of a primer layer in contact with a metal substrate, a nitrocellulose undercoat layer as previously described in contact with the primer, and a methyl methacrylate lacquer top layer in contact with the undercoat layer. However, it will be obvious from the foregoing description that the primer layer can consist of two or more layers of two or more different priming compositions, followed in sequence by a nitrocellulose undercoat layer and a methyl methacrylate lacquer top layer.

The finishing systems of this invention are useful in obtaining suitable adhesion of methyl methacrylate lacquer top layers to those primed metal articles to which they do not adhere well when the top layer is in direct contact with the primer layer. Thus, the invention provides a means of fully utilizing the excellent outdoor durability of methyl methacrylate lacquers, which heretofore has not been possible because of poor adhesion to widely used types of primers.

It is apparent that many widely different embodiments of this invention can be made without departing from the spirit and scope thereof; and, therefore, it is not intended to be limited except as indicated in the appended claims.

I claim:

1. A metal article having a hard, adherent, multiple-layer coating consisting of a layer of pigmented primer in adherent contact with said metal, a layer of undercoat in adherent contact with said primer, and a topcoat layer of pigmented methyl methacrylate lacquer in adherent contact with said undercoat, said undercoat consisting of lacquer-grade nitrocellulose and 5–30% of pigment based on the total weight of the nitrocellulose, and the methyl methacrylate component of said pigmented methyl methacrylate lacquer having a relative viscosity between 1.117 and 1.196.

2. The process of improving the adhesion to a primed metal article of a pigmented methyl methacrylate lacquer topcoat in which the methyl methacrylate component has a relative viscosity of between 1.117 and 1.196, which comprises applying to said primed article a liquid undercoat composition and drying it before applying said pigmented methyl methacrylate lacquer topcoat, said liquid undercoat composition consisting of a solution of lacquer-grade nitrocellulose and 5–30% of pigment based on the total weight of the nitrocellulose.

References Cited in the file of this patent

UNITED STATES PATENTS 2,063,078    Barrett _____ Dec. 8, 1936